United States Patent [19]

Galarowic et al.

[11] 4,018,328
[45] Apr. 19, 1977

[54] MEANS FOR PRODUCING A DUAL ACCELERATION-DECELERATION MOVEMENT FOR A TRANSFER SHUTTLE

[75] Inventors: Lawrence A. Galarowic, Dearborn; Glenn B. Waineo, Detroit; David F. Johnson, Livonia, all of Mich.

[73] Assignee: Visi-Trol Engineering Company, Detroit, Mich.

[22] Filed: Oct. 28, 1975

[21] Appl. No.: 626,260

[52] U.S. Cl. .............................. 198/741; 198/747; 198/858
[51] Int. Cl.² ......................................... B65G 25/08
[58] Field of Search .......... 198/221, 218, 747, 736, 198/738, 858, 741; 74/55, 103

[56] References Cited

UNITED STATES PATENTS

| 2,871,723 | 2/1959 | Sephard | 74/55 X |
| 3,006,458 | 10/1961 | Spiazzi | 198/221 |

Primary Examiner—Evon C. Blunk
Assistant Examiner—Douglas D. Watts
Attorney, Agent, or Firm—Gifford, Chandler, Sheridan & Sprinkle

[57] ABSTRACT

A transfer shuttle is alternately moved in a forward motion and then a rearward motion by a rotary power drive. As the rotary power drive is rotated through an arc of 180°, a dog, coupled to the power drive, is accelerated and then decelerated before engaging the work piece transfer member, and then accelerated and decelerated after engaging the transfer member to complete its forward motion.

9 Claims, 7 Drawing Figures

4,018,328

MEANS FOR PRODUCING A DUAL ACCELERATION-DECELERATION MOVEMENT FOR A TRANSFER SHUTTLE

BACKGROUND OF THE INVENTION

This invention relates to a shuttle for providing an intermittent drive motion to a work piece transfer member and more particularly to such a shuttle having a controlled acceleration and deceleration motion produced by a power means being rotated at a uniform rate of rotation.

Industrial shuttle mechanisms are employed to move a work piece transfer member in an intermittent motion. The shuttle mechanism employs a dog that is reciprocated in a forward direction to move the work piece transfer member in the same direction and then in the opposite direction to return the dog to its initial position to repeat the cycle with the next work piece transfer member. The dog is coupled to a rotary power means that is rotated in a uniform rate of speed through a 180° arc during the drive motion and then rotated in the opposite direction to return the dog to its initial position. A cam is employed between the dog and the power means to change the rotating motion of the power means to a linear motion for the dog. At the beginning of the drive stroke, the dog is spaced from the work piece transfer member. The dog is then moved toward the work piece transfer member in an accelerating motion that produces a severe and noisy shock to the work piece transfer member as it is engaged in its stationary position by the dog.

SUMMARY OF THE INVENTION

One of the objects of the present invention is to reduce the shock developed as the dog in a transfer shuttle engages the work piece transfer member. In the preferred embodiment, the cam coupling the rotary drive means to the dog is shaped such that the rotary motion of the drive means causes the dog to accelerate as it moves from its initial drive position and then to decelerate as it engages the work piece transfer member. The dog is then accelerated as it moves the work piece transfer member to its next stationary position.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
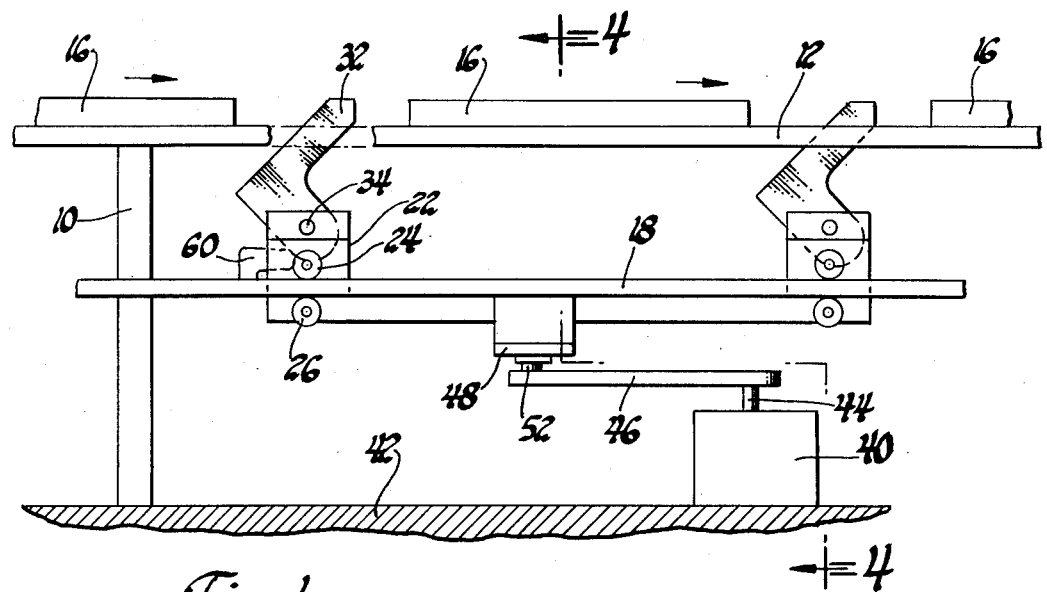
FIG. 1 is a partially fragmentary view of a transfer shuttle having a dog for driving work piece transfer member in accordance with the preferred embodiment of the invention.
Figure 4:
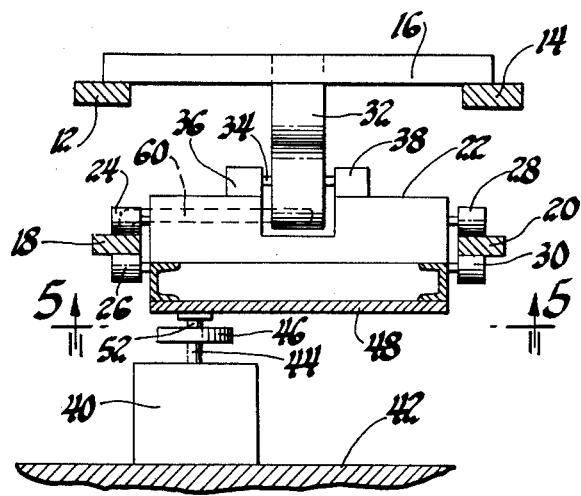
FIG. 4 is a sectional view taken along line 4—4 of FIG. 1.

Referring to FIGS. 1 and 4, a frame 10 is illustrated for supporting a pair of spaced parallel supports 12 and 14. A work piece transfer member 16 is slidably mounted on supports 12 and 14.

A second pair of spaced parallel supports 18 and 20 are mounted beneath and parallel to supports 12 and 14, respectively.

An elongated carriage 22, mounted between supports 18 and 20, has a first pair of rollers 24 and 26 engaging the upper and lower surfaces respectively of support 18, and a second pair of rollers 28 and 30 engaging the upper and lower surfaces of support 20.

Figure 3:
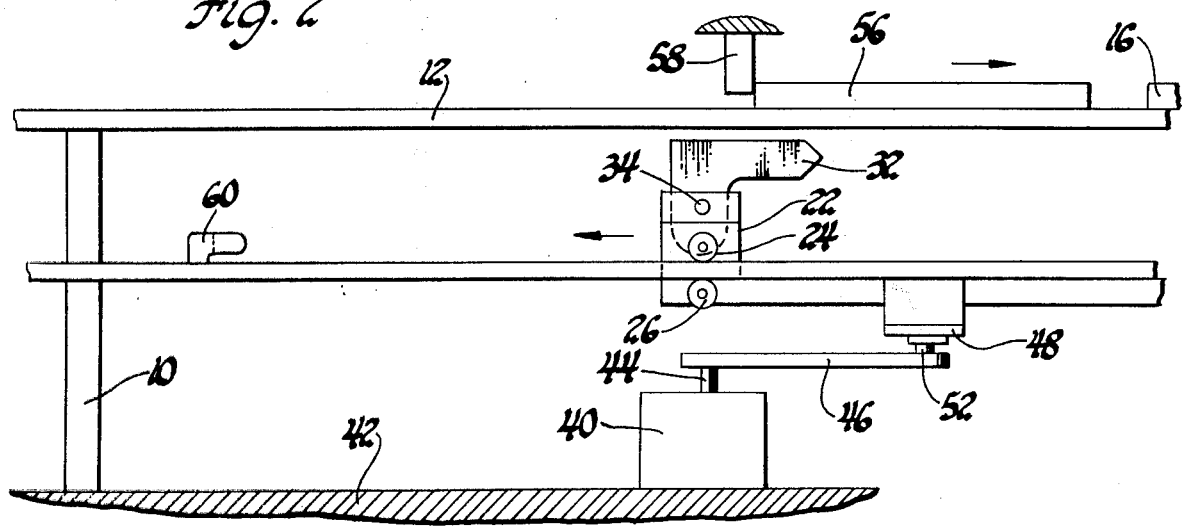
FIG. 3 is a view showing the transfer shuttle in its reverse motion.

A dog 32 is pivotly supported by a shaft 34 between a pair of bearings 36 and 38, mounted on carriage 22. Dog 32 is weighted in such a manner that it occupies either an upright position as illustrated in FIG. 1, or a lowered position as illustrated in FIG. 3. In its upright position, the dog is disposed in the path of motion of work piece transfer member 16 along supports 12 and 14.

A second dog 32B, mounted between a pair of bearings, is also carried on support 22 to advance transfer member 16 after it has been moved by dog 32.

Figure 2:
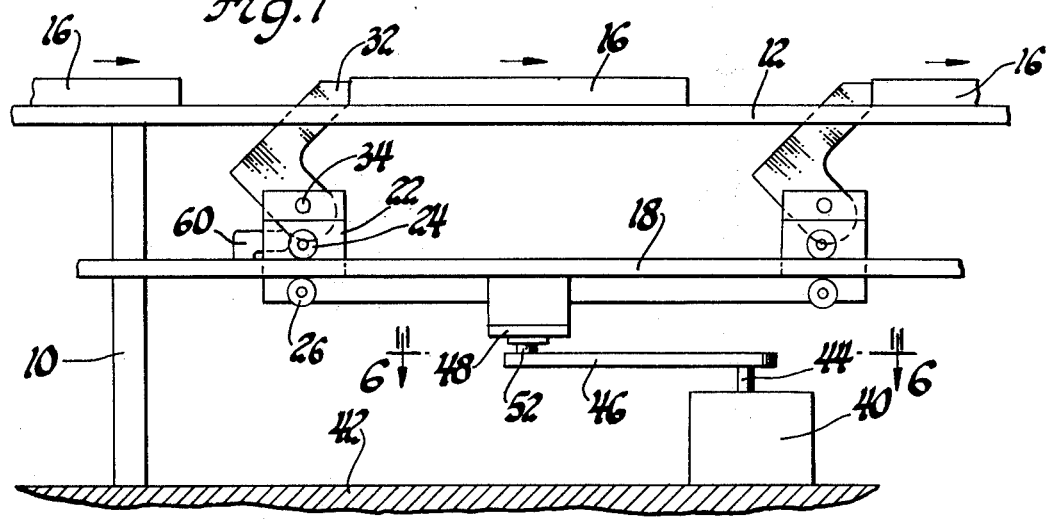
FIG. 2 is a view similar to FIG. 1 but illustrating the dog engaging the work piece transfer member.
Figure 6:
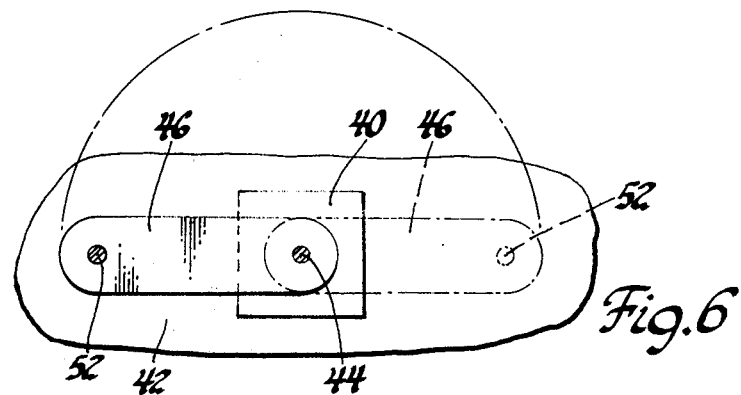
FIG. 6 is a fragmentary view taken along line 6—6 of FIG. 2 and enlarged for clarity.

Referring to FIGS. 2 and 6, preferably a hydraulically actuated power means 40 is mounted on support 42. Power means 40 has an output shaft 44 connected to a drive arm 46 which is movable between a first drive position illustrated in solid in FIG. 6, and a second drive position illustrated in phantom in FIG. 6 between which the arm is moved through an arc of 180°.

Figure 5:
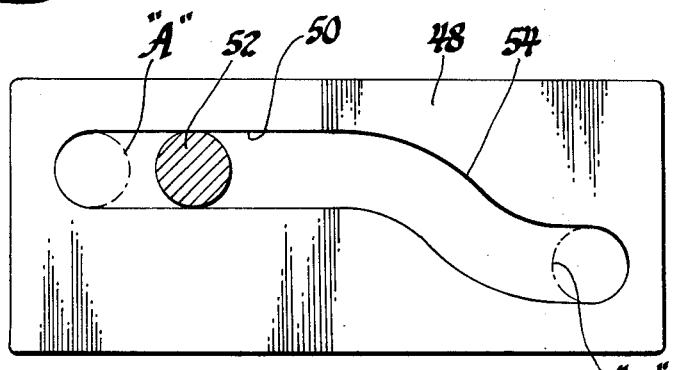
FIG. 5 is a sectional enlarged view of the cam as seen along line 5—5 of FIG. 4.

Referring to FIGS. 4 and 5, carriage 22 has a cam 48 with an elongated slot 50 facing support 42.

More particularly the cam slot 50 includes a first lineal section 51 which begins a point A adjacent the track 18 and extends toward the track 20 and generally perpendicular to the longitudinal axes of the tracks 18 and 20.

An angled section 54 of the cam slot 50 adjoins the lineal section 51 and interconnects a second lineal section 53 of the cam slot 50 with the first lineal section 51. The axes of the lineal sections 51 and 53 are substantially parallel to each other but in a spaced apart relation. A roller 52 carried by arm 46 is disposed in slot 50 in such a manner that as arm 46 is rotated in one direction, carriage 22 is moved in a drive motion and as arm 46 is rotated in the opposite direction, carriage 22 is moved in a return motion.

As arm 46 is moved through its 180° arc (FIG. 6) at a uniform rate of rotation, the roller 52 engages the cam slot 50 and drives the carriage 18 rightwardly as viewed in FIG. 1. Simultaneously the roller 52 moves from its initial position A (FIG. 5) and along the first lineal section 51 of the cam slot. This action accelerates the carriage 18 forwardly in the well known fashion as shown at 100 in FIG. 7.

Figure 7:
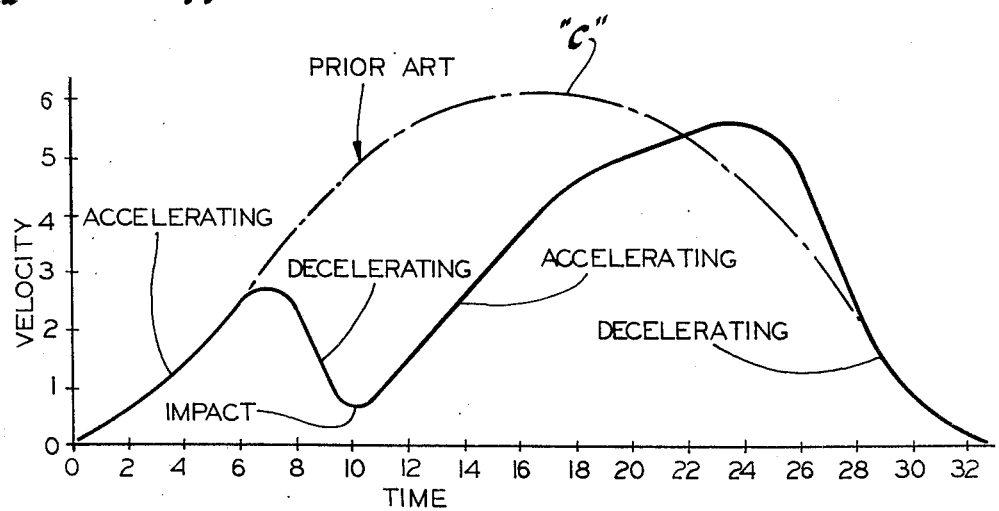
FIG. 7 is a graph illustrating a general comparison between the motion of the dog produced by the present invention and the dog motion produced by the prior art.

As the roller 52 enters the angled section 54 of the cam slot 50, however, the lineal velocity of the carriage decreases as shown at 102 in FIG. 7. At the end of this deceleration and, hence, at the end of the angled section 54, the dog 32 impacts the member 16 and then rapidly accelerates the member forwardly as shown at 104 in FIG. 7.

Roller 52 then moves the second lineal section 53 of the slot to a position at B and then returns to position A to complete the drive stroke.

In operation, work piece transfer member 16 is moved along supports 12 and 14 in an intermittent motion, followed by another work piece transfer member 16. Assuming that work piece transfer member 16 is in the stationary position illustrated in FIG. 1, and dog 32 is in its upright position behind work piece transfer member 16, as power means 40 begins its drive stroke, the dog approaches work piece transfer member 16 until it contacts such member as illustrated in FIG. 2. Referring to FIG. 7, the initial motion of the dog is first an accelerating motion and then a decelerating motion prior to engaging work piece transfer member 16. After the dog engages work piece transfer member 16 it is accelerated to move the work piece transfer member toward its next stationary position upon completing the drive stroke.

Assuming that the next work piece transfer member 16 is then moved by appropriate drive means 58 to the position occupied by work piece transfer member 16 in FIG. 1, carriage 20 is then returned toward its initial position. As dog 32 is moved in its return stroke, it is knocked down to its lower position by the following work piece transfer member 16. The dog is then returned to its upward position illustrated in FIG. 1 by engaging a finger 60.

Thus it can be seen that during the initial portion of its drive motion, dog 32 is accelerated and then decelerated so as to have a slight hesitation just as it engages work piece transfer member 16 thereby enduring the impact that is characteristic of transfer shuttle mechanisms.

FIG. 7 illustrates at C the generally characteristic acceleration curve of a prior art shuttle transfer in which the dog is moved first in an accelerating motion up to and including the time when it engages the work piece transfer member which causes the severe shock or impact associated with conventional transfer shuttle mechanisms. It is this type of impact that is substantially reduced by the present invention.

Having described our invention, we claim:

1. In a machine for transferring a work piece transfer member along a predetermined path of motion, the combination comprising:
 a support;
 a dog mounted on the support so as to be movable therealong between a first drive position to a second drive position, the dog being engageable with the work piece transfer member to move it along a portion of the distance between said first drive position and said second drive position;
 rotary drive means; and
 means for drivingly connecting said rotary drive means with said dog, said connecting means further comprising:
 a cam member having a cam slot formed therein; said cam slot having a lineal section and an angled section,
 a driving member attached to said rotary drive means and received in said cam slot, whereby as the rotary drive means is rotated at a uniform rate of motion, the dog is accelerated as the driving member moves along the lineal section of the cam slot and then decelerated as the driving member moves along the angled section of the cam slot before it engages the work piece transfer member to move it along said predetermined path of motion.

2. The combination as defined in claim 1, in which the dog is accelerated and then decelerated after it engages the work piece transfer member.

3. A combination as defined in claim 2, in which the dog is moved at a constant velocity as it engages the work piece transfer member.

4. A conveyor comprising:
 an elongated support;
 a work piece transfer member mounted on the support so as to be movable therealong from a first drive position to a second drive position;
 a drive member mounted adjacent the support so as to be movable along a path of motion parallel to the work piece transfer member in either a first direction in which the drive member is operative to engage the work piece transfer member to move it from said first drive position to said second drive position, or in a second, opposite direction;
 rotary power means connected to the drive member to move it in either said first direction or said second direction depending upon the direction of rotation of the power means; and
 a cam member attached to the rotary power means and
 a cam plate coupled to the drive member, said cam plate having an elongated cam slot with a lineal section and an angled section wherein said cam member is received within said cam slot so that as the power means is rotated at a uniform and continuous rate of rotation, the drive member is moved along said predetermined path of motion so as to be accelerated and decelerated as it approaches the work piece transfer member and then accelerated and decelerated after engaging the work piece transfer member to drive the work piece from said first drive position to said second drive position.

5. A combination as defined in claim 4, in which the work piece transfer member is disengaged from the drive member as it is moved in said opposite direction.

6. A combination as defined in claim 4, in which the rotary drive means rotatably drives the cam member in a substantially semicircular arc.

7. In a conveyor system having support means adapted to support at least one work piece so that said work piece is lineally movable along said support means, means for lineally moving said work piece along said support means from a first to a second longitudinal position comprising:
 a carriage lineally reciprocally slidably mounted adjacent said support means;
 a drive member attached to said carriage and adapted to contact and transport said work piece from said first to said second position as the carriage moves in one lineal direction;
 means for moving said carriage in last said lineal direction, said moving means comprising:
 rotary drive means for moving a connecting member substantially in a semicircular arc;
 a cam plate attached to said carriage and having a cam slot formed therein, said cam slot having a lineal section and an angled section and adapted to slidably receive the connecting member therein so that said connecting member slides along said cam slot as said connecting member moves along said arc, whereby as said connecting member moves along said arc at a uniform speed the carriage linearly accelerates as the connecting member slides along the lineal section of the cam slot and decelerates as it slides along said curved section of the cam slot whereby the drive member contacts the work piece substantially at the end of the deceleration of the carriage and thereafter accelerates to move the work piece from said first to said second position.

8. The invention as defined in claim 7 wherein said connecting member is a roller.

9. The invention as defined in claim 7 wherein said rotary drive means comprises an elongated arm, a motor connected to one end of said arm, and the connecting member attached to the other end of the arm.

* * * * *